US007980173B2

(12) United States Patent
Carmack et al.

(10) Patent No.: US 7,980,173 B2
(45) Date of Patent: Jul. 19, 2011

(54) HYDRAULIC COMPACTOR SYSTEM HAVING FLEXIBLE HOSES WITH BREAKAWAY COUPLERS

(75) Inventors: Cameron D. Carmack, Dayton, OH (US); David L. Imler, Tipp City, OH (US); Kelly Grant Fleener, Harford, KY (US)

(73) Assignee: Catlow, Inc., Tipp City, OH (US)

( * ) Notice: Subject to any disclaimer, the term of this patent is extended or adjusted under 35 U.S.C. 154(b) by 328 days.

(21) Appl. No.: 12/283,565

(22) Filed: Sep. 12, 2008

(65) Prior Publication Data

US 2010/0064910 A1 Mar. 18, 2010

(51) Int. Cl.

| | |
|---|---|
| ***B30B 5/00*** | (2006.01) |
| ***F16L 35/00*** | (2006.01) |
| ***B30B 1/32*** | (2006.01) |

(52) U.S. Cl. .................. 100/240; 100/347; 100/269.16; 137/68.14; 285/1; 285/316

(58) Field of Classification Search .................... 100/35, 100/240, 347, 269.01, 269.16; 137/614, 137/614.03, 614.04, 614.05, 68.14; 285/1, 285/83, 84, 306, 316

See application file for complete search history.

(56) References Cited

U.S. PATENT DOCUMENTS

| | | | | |
|---|---|---|---|---|
| 4,682,795 | A | | 7/1987 | Rabushka et al. |
| 4,905,733 | A | * | 3/1990 | Carow ..................... 137/614.04 |
| 5,348,125 | A | | 9/1994 | Stribling |
| 5,579,684 | A | | 12/1996 | Stribling |
| 5,947,142 | A | * | 9/1999 | Nimberger et al. ........ 137/68.14 |
| 6,158,336 | A | * | 12/2000 | Cambiano ..................... 100/345 |
| 6,238,151 | B1 | * | 5/2001 | Takagi .......................... 408/230 |
| 6,899,131 | B1 | | 5/2005 | Carmack et al. |

* cited by examiner

*Primary Examiner* — Jimmy T Nguyen

(74) *Attorney, Agent, or Firm* — Jacox, Meckstroth & Jenkins

(57) ABSTRACT

A hydraulic compactor system includes a portable container adapted to be transported by a truck and having a chamber for receiving a waste material to be compacted. The container has a self-contained compacting ram actuated by a hydraulic cylinder, and a remote hydraulic power supply unit is connected to the hydraulic cylinder by flexible hydraulic hoses. Each of the hoses is provided with a breakaway hydraulic coupling having two sections connected by tension releasable coupling means with the sections having spring biased valves which are open when the sections are coupled together and automatically close when the sections separate due to a predetermined tension force on the hoses. Each breakaway coupling compensates for increases in hydraulic fluid pressure to prevent separation of the coupling sections when the fluid pressure increases to actuate the hydraulic compacting cylinder.

3 Claims, 1 Drawing Sheet

HYDRAULIC COMPACTOR SYSTEM HAVING FLEXIBLE HOSES WITH BREAKAWAY COUPLERS

BACKGROUND OF THE INVENTION

In the art of hydraulic compactor systems for waste material, it is common to use a roll-off or portable container having a compacting chamber for receiving the material and a self-contained compacting ram actuated by the hydraulic cylinder. The cylinder is actuated by a remotely located power supply unit which is connected to the hydraulic cylinder in the container by flexible lines or hoses, for example, as disclosed in U.S. Pat. No. 5,348,125 and No. 5,579,684. After the container chamber is full with compacted refuse or waste material, the container and the self-contained ram and hydraulic cylinder are disconnected from the hydraulic fluid lines or hoses with the use of quick connect/disconnect fittings. The container, ram and actuating cylinder are then transported by a truck to a remote waste disposal site or landfill. After the container is emptied and returned to the waste collection site, the hydraulic fluid hoses are reconnected, and the cycle is repeated. Sometimes, the hydraulic fluid power supply unit is located within an adjacent building or some other form of enclosure and is not easily accessible to the personnel or truck driver who removes the full container and returns the empty container.

As disclosed in the above patents, when a full container and compactor are picked up, the truck driver or other personnel disconnect the hydraulic fluid lines or hoses using the quick connect/disconnect fittings which usually have internal valves for closing the fluid passages in the hydraulic hoses. The fittings are manually actuated or released to disconnect the hydraulic cylinder for the compacting ram within the container. It has been found that too frequently, the truck driver who picks up the self-contained compactor, forgets to disconnect the hydraulic hoses from the power unit and then drives away with the power unit and compactor still attached. This results in substantial damage to the hydraulic fluid hoses and fittings and sometimes to the hydraulic power supply unit and/or the container and compactor and other property damage.

SUMMARY OF THE INVENTION

The present invention is directed to an improved self-contained compactor system which includes a portable container having a chamber for receiving refuse or waste material and which also incorporates a self-contained compactor in the form of a ram actuated by a hydraulic cylinder. The hydraulic cylinder is connected by flexible hydraulic fluid lines or hoses to a remote hydraulic fluid power supply unit, and each of the hoses. Each of the hoses includes a breakaway coupler which protects the components of the compactor system in the event the compactor assembly is picked up and moved away by a truck or other vehicle without manually disconnecting the hydraulic fluid hoses extending to the power unit which operates the compactor ram. Each of the breakaway couplers is constructed to separate with a predetermined tension force on the hose connected to the coupler and incorporates a hydraulic fluid pressure compensator which prevents separation of the breakaway coupler as the fluid pressure increases to actuate the hydraulic cylinder connected to move the compacting ram.

Other features and advantages of the invention will be apparent from the following description, the accompanying drawing and the appended claims.

DESCRIPTION OF THE ILLUSTRATED EMBODIMENT

Figure 1:
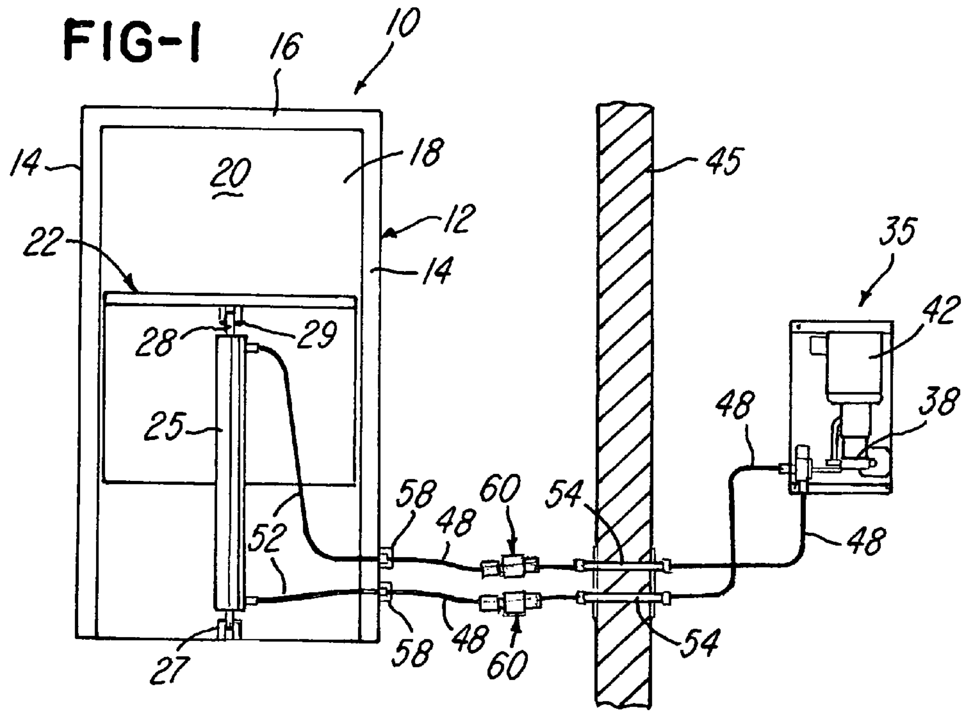
FIG. 1 is diagrammatic top view of the hydraulic compactor system which incorporates breakaway couplers in the hydraulic fluid lines in accordance with the invention.

FIG. 1 illustrates diagrammatically a top view of a portable or roll-off refuse or trash compactor 10 including a fabricated steel container 12 having opposite side walls 14, an end wall 16 and a bottom wall 18 which define an open top compacting chamber 20 for receiving refuse or waste material. A fabricated steel compacting ram 22 is supported within the container 12 for horizontal movement in response to actuation of a double acting hydraulic cylinder 25 pivotally connected to the container 12 at 27 and having a piston rod 28 pivotally connected to the ram 22 at 29. The portable hydraulic compactor 10 with the self-contained compacting ram 22 may have any form of construction, configuration and assembly, but basically includes a rigid container and a rigid compacting ram actuated by hydraulic cylinder.

The hydraulic cylinder 25 is operated or actuated by a remote hydraulic fluid power supply unit 35 which includes a high pressure hydraulic pump 38 driven by an electric motor 42 and the controls for operating the motor 42. In most installations, the power unit 35 is located close to the compactor 10 with the unit 35 and compactor 10 located on opposite sides of a wall 45 of a building or room or other enclosure which protects the power supply unit 35. Flexible hydraulic fluid lines or hoses 48 connect the power supply unit 35 to corresponding hydraulic lines or hoses 52 within the container 12 and connected to opposite ends of the double acting hydraulic cylinder 25. As shown, the hydraulic fluid hoses 48 may extend through corresponding tubes or pipes 54 within the wall 45 and are connected to the corresponding hydraulic lines or hoses 52 by quick connect/disconnect fittings 58 mounted on a side wall 14 of the container 12. The fittings 58 usually include spring biased check valves. After the chamber 12 is filled with compacted material and it is desired to transport the compactor 10 to a landfill or waste disposal site, the fittings 58 are manually disconnected. The fittings 58 are manually reconnected after the compactor 10 is emptied and returned to the compacting site.

Figure 2:
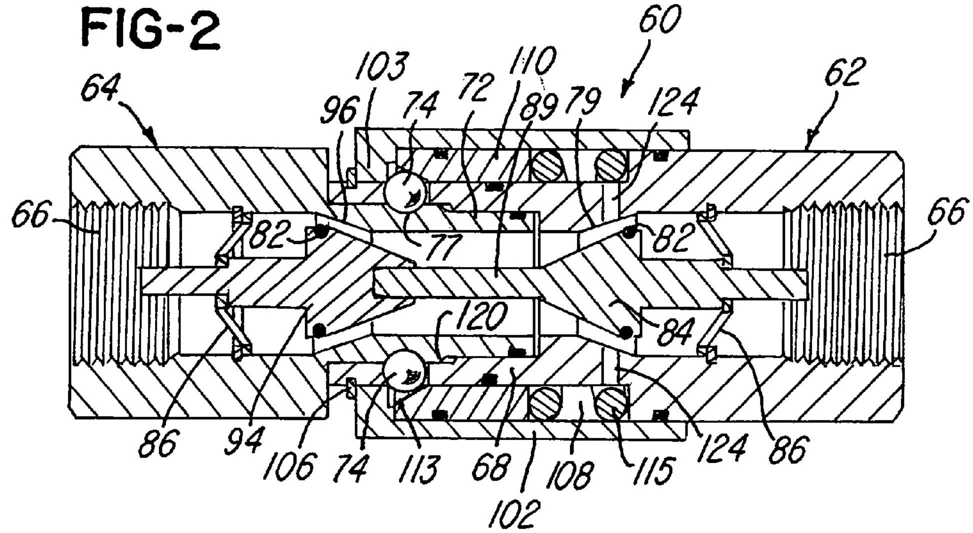
FIG. 2 is an axial section of one of the breakaway couplings shown in FIG. 1.

In accordance with the present invention, each of the hydraulic fluid lines or hoses 48 between the compactor 10 and the hydraulic fluid power supply unit 35 is provided with a breakaway coupler or coupling 60 which is shown in axially cross-section in FIG. 2. In general, the breakaway coupling 60 is constructed similarly to the couplings disclosed in U.S. Pat. No. 4,682,795 and in U.S. Pat. No. 6,899,131 which issued to the Assignee of the present invention. The disclosures of these patents are herein incorporated by reference, and the disclosed breakaway couplings are commonly used in fuel supply hoses extending from a fuel dispenser to a fuel nozzle.

The coupling 60 includes a first body or section 62 and a second body or section 64 each having an outer end portion with internal threads 66 for receiving threaded fittings (not shown) on the adjacent ends of the hoses 48. The coupling section 62 has a tubular inner portion 68 which receives an inner tubular portion 72 of the coupling section 64. A set of circumferentially spaced balls 74 are retained within corresponding slightly tapered holes within the tubular portion 68 and normally seat within an external circumferential tapered groove 77 formed within the tubular portion 72 of the coupling section 64.

The body or coupling section 62 also has an internal tapered valve seat 79 which receives a resilient sealing O-ring 82 mounted on a valve member 84. The sealing O-ring 82 and valve member 84 are urged against the valve seat 79 by a coil spring member 86, and the valve member has an axially projecting stem 89 which seats within a bore formed within the inner end portion of a valve member 94 which also carries a resilient sealing O-ring 82. The valve member 94 and sealing ring 92 are urged or biased toward a tapered valve seat 96 within the tubular portion 72 of the coupling section 64 by another coil spring 86. When the coupling sections 62 and 64 are connected or coupled together (FIG. 2), the valve members 84 and 94 are shifted to their normally open positions to permit the flow of hydraulic fluid through the coupling 60.

A cylindrical sleeve 102 has an annular end portion 103 mounted on the tubular portion 68 of the coupling section 62 and is secured by a retaining ring 106. The sleeve 102 is sealed to the body section 62 by resilient O-rings and cooperates with the tubular portion 68 to define an annular chamber 108. A cylindrical piston 110 is supported within the chamber 108 for axial sliding movement and is sealed by resilient O-rings to the sleeve 102 and the tubular portion 68. The piston 110 has a frusto-conical or tapered surface 113 which normally engages the balls 74 and cams or urges the balls into the groove 77. A compression coil spring 115 is also confined within the chamber 108 and urges the piston 110 axially for urging and holding the balls 74 within the groove 77.

When a predetermined tension force is applied to the coupling sections 62 and 64, the balls 74 are cammed radially outwardly by the tapered annular surface forming one end of the groove 77, and the balls 74 cam or force the piston 110 to compress the spring 115. As the coupling sections 62 and 64 separate, the valve members 84 and 94 shift to their closed positions by the springs 86 for retaining hydraulic fluid within the connected hoses 48. After the sections 62 and 64 separate, the balls 74 are retained within the tubular portion 68 as a result of the slightly tapered holes which receive the balls 74. When it is desired to recouple the coupling sections 62 and 64, the tubular portion 72 is simply pressed into the tubular portion 68, and an annular tapered shoulder or cam surface 120 on the tubular portion 72 forces the balls 74 radially outwardly. The balls 74 cam or force the piston 110 axially to compress the spring 115 until the tubular portion 72 is completely inserted into the tubular portion 68 when the balls 74 snap back into the groove 77 due to the force exerted on the piston 110.

A set of diametrically opposed radial fluid passages or ports 124 are formed within the tubular portion 68 and extend outwardly from the valve seat 79 to the chamber 108. As the pressure of the hydraulic fluid within the coupling 60 increases to actuate the hydraulic cylinder 25 and face the ram 22 to compact the waste material, the hydraulic fluid also pressurizes the chamber 108 to apply a greater axial pressure on the piston 110 to hold the balls 74 within the groove 77. Thus the hydraulic pressure within the chamber 108 and against the piston 110 prevents the coupling sections 62 and 64 from separating as a result of the higher pressure required to actuate the cylinder 25 and to move the ram 24 for compacting.

From the drawing in the above description, it is apparent that a hydraulic compactor system constructed in accordance with the invention provides desirable features and advantages. As an important advantage, in the event that the compactor 10 is picked up by a truck for delivery to a remote waste disposal site, and the truck operator forgets to disconnect the hydraulic hoses 48 using the fittings 58, the couplings 60 will breakaway and prevent damage to the hydraulic hoses 48, the fittings 58 the compactor 10 and the hydraulic fluid power unit 35. As a result, the couplers or couplings 60 prevent significant down time in the use of the hydraulic compactor as required for repairing the damage. As also apparent, the components or sections 62 and 64 of each coupler 60 may be quickly recoupled simply by pushing the sections together. The passages or ports 124 also permit the hydraulic fluid pressure to compensate or counterbalance an increase of pressure in the hydraulic hoses when a substantial hydraulic pressure is required in the hydraulic cylinder 25 to move the ram 22 for compacting the waste material. This compensation prevents the coupler sections 62 and 64 from separating due to the higher hydraulic pressure during actuation of the hydraulic cylinder 25.

While the form of compactor apparatus herein described constitutes a preferred embodiment of the invention, it is to be understood that the invention is not limited to the precise form of apparatus disclosed, and that changes may be made therein without departing from the scope and spirit of the invention as defined in the appended claims.

What is claimed is:

The invention claimed is:

1. A hydraulic compactor system comprising a movable container adapted to be moved by a truck and defining a chamber for receiving waste material to be compacted, a ram within said chamber and movable between a retracted position and an extended position, a double acting hydraulic cylinder supported by said container and connected to move said ram within said chamber between said retracted position and said extended position and movable with said container, a first set of hydraulic fluid hoses connecting said cylinder to a set of corresponding connect/disconnect fittings supported by said container, a hydraulic power supply unit spaced remotely from said container and connected by a second set of hydraulic fluid hoses to corresponding said fittings, a breakaway coupler within an intermediate portion of each of said hoses in said second set of hydraulic hoses and spaced from said fittings, each said breakaway coupler including a first section and a second section each defining a hydraulic fluid passage and releasably coupled for moving said sections between a coupled condition and a separated condition in response to a predetermined tension force on said hoses of said second set, a spring bias valve member within said hydraulic fluid passage in each of said first and second sections of each said coupler and movable between an open position when said first and second sections are in said coupled condition and a closed position when said first and second sections are in said separated condition, and said sections of each said coupler being movable from said coupled condition to said separated condition in response to accidentally moving said container, said ram, said hydraulic cylinder, said first set of hoses and said fittings away from said power supply unit and said second set of hoses without first manually disconnecting said set of connect/disconnect fittings.

2. A compactor system as defined in claim 1 wherein each said coupler includes an annular piston and compression spring within an annular piston chamber on said first section of said coupler and urging a set of circumferentially spaced balls into an external groove within said second section, and said first section includes a port connecting said hydraulic fluid passage in said first section to said piston chamber for increasing the hydraulic fluid pressure against said piston in response to an increase in hydraulic fluid pressure within said hydraulic hoses to prevent release of said coupler due to an increase in hydraulic fluid pressure for operating said hydraulic cylinder and said ram.

3. A compactor system as defined in claim 1 wherein said second set of hydraulic fluid hoses extend from said hydraulic power supply unit through a building wall to said fittings, and each said coupler is positioned in one of said hoses of said second set of hoses between said wall and said fittings.

* * * * *